United States Patent [19]
Gabriel et al.

[11] Patent Number: 4,754,185
[45] Date of Patent: Jun. 28, 1988

[54] MICRO-ELECTROSTATIC MOTOR

[75] Inventors: Kaigham J. Gabriel, Fair Haven; Robert K. Prud'Homme, Princeton Junction; William S. N. Trimmer, Belle Mead, all of N.J.

[73] Assignee: American Telephone and Telegraph Company, AT&T Bell Laboratories, Murray Hill, N.J.

[21] Appl. No.: 919,789

[22] Filed: Oct. 16, 1986

[51] Int. Cl.$^4$ .............................................. H02N 7/00
[52] U.S. Cl. .................................... 310/309; 318/116
[58] Field of Search ........................ 310/309; 318/116

[56] References Cited

U.S. PATENT DOCUMENTS

| | | | |
|---|---|---|---|
| 2,739,248 | 3/1956 | Meier | 310/309 |
| 3,320,517 | 5/1967 | Gignoux | 310/309 X |
| 3,400,282 | 9/1968 | Felici | 310/309 |
| 3,629,624 | 12/1971 | Staudte | 310/309 X |
| 3,889,138 | 6/1975 | Allen et al. | 310/309 |
| 4,061,043 | 12/1977 | Stiles | 310/309 X |

FOREIGN PATENT DOCUMENTS 0694962 10/1979 U.S.S.R. .............................. 310/309

OTHER PUBLICATIONS

*Torque on a Resistive Rotor in a Quasi Electrostatic Rotating Field*, by C. Kooy, Appl. Sci. Res. 20, Feb. 1969, pp. 161–172.

*Primary Examiner*—Mark O. Budd
*Attorney, Agent, or Firm*—Jerry W. Herndon

[57] ABSTRACT

Miniaturized linear and rotary electrostatic motors. The motors are fabricated by disposing a plurality of conductive lands onto insulating substrates and then filling in the spaces between the lands by deposition of an insulating material. A final layer of insulating material is then disposed over each of the entire surfaces containing the lands to form smooth bearing surfaces. The bearing surfaces of two of these elements are placed in contact. In one embodiment, the natural lubrication of the bearing surfaces aids movement. In another embodiment, a special lubricating film is placed between the substrates. Arrangements are made for maintaining alignment of the contacting elements. The lands are selectively energized in a manner to effect movement of one element with respect to the other.

17 Claims, 12 Drawing Sheets

MICRO-ELECTROSTATIC MOTOR

TECHNICAL FIELD

The invention relates generally to the field of electrostatic motors and, in particular, to miniature and micro-linear and rotary electrostatic motors in which stators and rotors are fabricated on substrates and are placed in sliding contact with each other, either directly or via a lubricating film, to maximize the electrostatic coupling and to eliminate problems of gap tolerances between the stators and rotors.

BACKGROUND OF THE INVENTION

Electrostatic motors have a long history. According to *A History of Electricity*, John Wiley and Sons, New York, 1898, pp. 506 and 507 and *The Works of Benjamin Franklin*, Whittemore, Niles, and Hall, Boston, 1856, Vol. 5, p. 301, Andrew Gordon and Benjamin Franklin built electrostatic motors in the 1750's, 100 years before the advent of magnetic electric motors. The first capacitor electrostatic motor was developed by Karl Zipernowsky in 1889, "Zipernowsky Electrostatic Motor", *Electrical World*, Vol. 14, p. 260 (1889).

A review of early electrostatic motors is given by Oleg Jefimenko in "Electrostatic Motors", Electret Scientific Company, Star City, 1973. In this review, Jefimenko describes the history of electrostatic motors from Gordon's electric bells to modern motors which can be powered from atmospheric electricity.

J. H. Staudte describes a small electrostatic motor adapted for use in a wristwatch in his U.S. Pat. No. 3,629,624. This patent suggests the use of photolithographic techniques to fabricate a plurality of pole faces (lands) on a rotor and stator of an electrostatic motor.

Despite their distinguished history, electrostatic motors have found few practical applications because of the high voltages and mechanical accuracies required. These constraints have generally limited the use of such motors to large applications. Even so, electromagnetic motors usually are used in larger systems. Unfortunately, electromagnetic forces do not scale well into the miniature and micro domain. However, electrostatic forces do scale well, giving the potential for miniature and micro use of electrostatic motors, if the above-summarized problems can be overcome.

SUMMARY OF THE INVENTION

An advance in the art is achieved in an electrostatic motor having a stator and a rotor fabricated on semiconductor substrates. The term "rotor" is used here to indicate a movable member, rather than being limited to rotational movement. A layer of insulating material is deposited onto one surface of the substrate of each of the stator and rotor.

In one embodiment, the natural lubricating qualities of the bearing surfaces are sufficient to allow operation of the motor. In another embodiment, a lubricating medium is placed between the bearing surfaces. Preferably, the lubricating medium comprises a mixture of micro-glass spheres suspended in oil.

Both linear and rotary motors may be constructed by arranging the stator and rotor lands linearly or circularly on the respective substrates. For a linear motor, alignment of the stator and rotor may be maintained by one or more grooves in the bearing surface of the stator or rotor and one or more mating ribs in the bearing surface of the other member.

For rotary motors, one method of alignment uses a circular opening in the bearing surface of one of the members at the center of rotation and a mating protrusion in the bearing surface of the other member. An alternative method is to deposit in the same step of forming the motive lands on the rotor a plurality of electrically common conductive alignment lands concentric about the center of rotation. Similarly, a plurality of mating conductive concentric lands are deposited on the stator. The stator alignment lands are partitioned into two hemispheres with the lands in each hemisphere being electrically common. Alignment is maintained by electromagnetic attraction between the stator and rotor alignment lands by applying opposite electrical potentials to the hemispheres.

In addition, a plurality of electrically conductive position sensing lands may be deposited in the bearing surfaces of the stator and rotor. The position-sensing lands are physically and electrically arranged into groups corresponding to the motive land groups of the stator and rotor. Output means electrically connected to the position sensing land groups on the stator provide indications of the capacitance between the stator lands of each position-sensing group and the rotor position-sensing lands. The motor may be used in conjunction with other miniature components, such as gears, that have been micromachined on substrates such as silicon.

DETAILED DESCRIPTION

Figure 1:
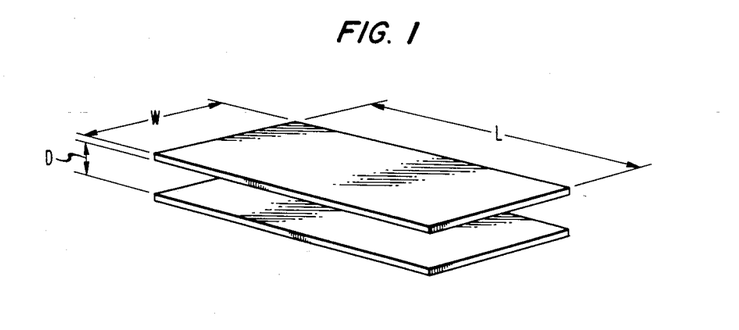
FIGS. 1 and 2 show matching electrostatic lands and are used to derive the force equations for electrostatic motors.

Two conducting parallel plates separated by an insulating layer, as shown in FIG. 1, create a capacitor with a capacitor given by $$C = \epsilon_r \epsilon_0 w l / d \tag{1}$$

where w is the width of the plates, l is the length of the plates, d is the separation between the two plates and $\epsilon_0$ and $\epsilon_r$ are the free space and relative permittivities. If a voltage V is applied across these two plates, the potential energy of this capacitor is $$U = \frac{1}{2} C V^2 = \frac{\epsilon_r \epsilon_0 w l V^2}{2d}. \tag{2}$$

Figure 2:
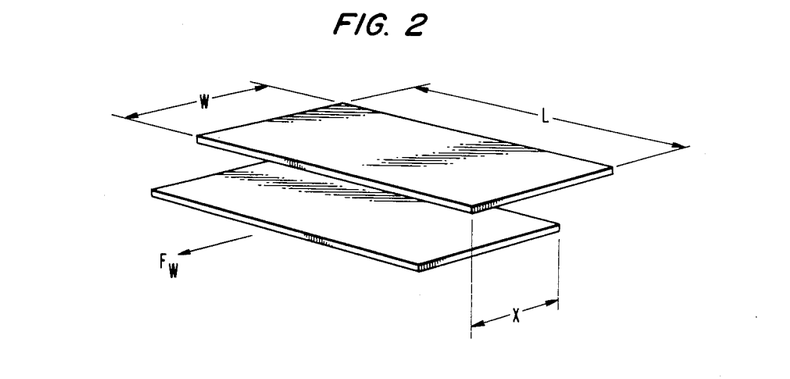

The force in any of the three directions (w, l, d) is given by the negative partial derivative of the potential energy in each of the three directions. To calculate the force in the w direction, consider the plates offset so they overlap by x, as shown in FIG. 2. In terms of the overlap x, the potential energy of the capacitor is now $$U = \frac{\epsilon_r \epsilon_0 \, x l V^2}{2d} \tag{3}$$

and taking the derivative with respect to x gives the force $$F_w = -\frac{\partial U}{\partial x} = -\frac{1}{2} \frac{\epsilon_r \epsilon_0 \, l V^2}{d} \tag{4}$$

The forces in the l and d directions are similarly, $$F_l = -\frac{\partial U}{\partial x} = -\frac{1}{2} \frac{\epsilon_r \epsilon_0 w V^2}{d} \tag{5}$$

$$F_d = -\frac{\partial U}{\partial d} = \frac{1}{2} \frac{\epsilon_r \epsilon_0 w l V^2}{d^2} \tag{6}$$

Equations 4 and 5 suggest that if two plates of a parallel capacitor are slightly displaced with respect to each other, a force parallel to the plates is developed tending to realign the plates. This aligning force is used herein to make linear and rotary electrostatic motors.

Equation 4 shows that the aligning force $F_w$ is proportional to the length of the edge l. In other calculations developed below, the force per unit edge, $f_w$, is used to calculate the force produced by the motors.

$$f_w = \frac{F_w}{l} = \frac{1}{2} \frac{\epsilon_r \epsilon_0 V^2}{d} = \frac{1}{3} \epsilon_r \epsilon_0 d E^2 \tag{7}$$

The force depends upon the electric field intensity squared, $E = V/d$. Hence, it is advantageous to use the maximum electric field intensity possible.

Figure 3:
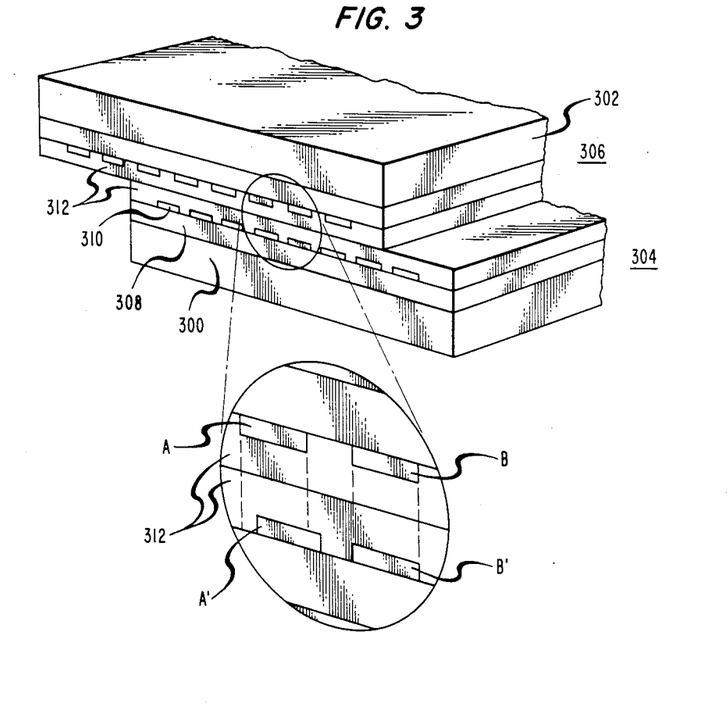
FIGS. 3 and 4 show cross-sectional views of a stator and rotor made of a semiconductor substrate with lands deposited onto the substrates and with the stator and rotor in physical contact.

A miniature linear electrostatic motor is shown in FIG. 3. Semiconductor substrates 300 and 302, preferably made of silicon, form the bases of both a stator 304 and a rotor 306. The stator and the rotor may be similar in essential respects. On one surface of the stator substrate, for example, an insulating layer 308, which may be silicon dioxide or silicon nitride ½ to 2 microns thick for example, is deposited. Using photolithographic techniques, a plurality of aluminum lands (pole faces) 310 are deposited on top of the insulating layer 308. At the present time, 6-micron technology is used. Each land is, therefore, 6 microns wide. Finally, another insulating layer 312 is deposited on top of the lands and the exposed surfaces of the underlying insulating layer 308. Because of the lands 310, the surface of the last insulating layer 312 is not completely flat. This surface may now be made flat by polishing or may be left in its nonflat state with the small valleys in the surface acting as reservoirs for a lubricating medium, as will be described in more detail below. In either event, the top insulating surfaces of the stator 304 and rotor 302 are placed together and aligned. This minimizes the distance between stator and rotor lands and maximizes the capacitance of the land pairs and the resulting motive force which can be generated. As implied above, the natural lubricating quality of the insulating layers 312 is sufficient to permit relative movement of the members.

Figure 4:
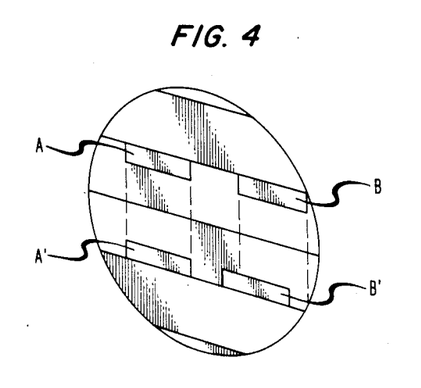

Each corresponding stator and rotor land pair, such as A—A', form a pair of differentially misaligned parallel plate capacitors as shown in the blowout of FIG. 3. When a voltage is applied to the misaligned lands A—A', a force (calculated above) is exerted which aligns lands A—A', as seen in FIG. 4. At this point, lands B—B' are misaligned and are in a position to be activated to cause movement of lands A—A' and B—B' back to the original position. Although the forces and motions in such a simple design are relatively small, they demonstrate the principles of the linear electrostatic motor described next.

Figure 5:
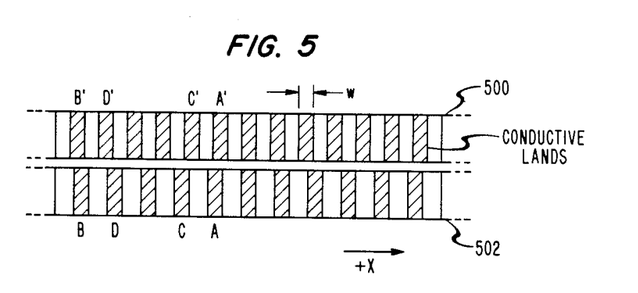
FIGS. 5, 6 and 7 show a phasing relationship between stator and rotor lands of a linear motor which allows for extended movement of the rotor.
Figure 6:
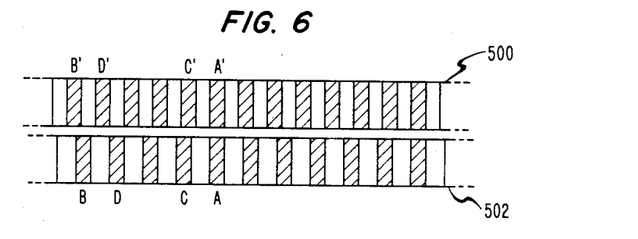

By differentially "phasing" the lands, motion can be sustained in either direction and the generated force can be increased. FIG. 5 shows a portion of one possible configuration of lands for such a motor. Given the relative positions of the top and bottom conducting lands, applying a voltage across lands A—A' (and all other lands in the same relative position) creates a force tending to align the lands. If the top member 500 is held stationary and the bottom member 502 is free to move, this force will cause a motion of w/3 in the +x direction (w is the width of one land). FIG. 6 shows the relative positions of the lands after lands A—A' have been energized and aligned.

Conversely, in FIG. 5, applying a voltage across lands B—B' (and all other lands in the same relative position) causes a motion of w/3 in the −x direction. Note that in the former case, lands C—C' would then be in a position to continue the +x motion and in the latter, lands D—D' would be in a position to continue the −x motion.

The aligning force per unit length was shown above to be $$f_w = \frac{1}{2} \frac{\epsilon_r \epsilon_0 V^2}{d}. \tag{7}$$

Figure 7:
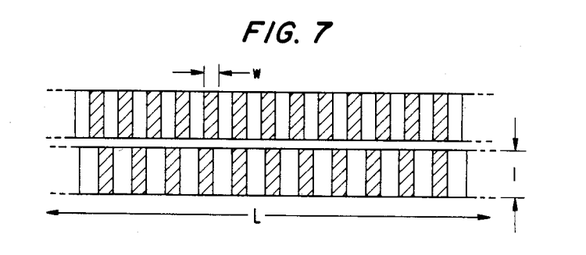

For a linear three-phase electrostatic motor of length L and a differential spacing as shown in FIG. 7, L/2.3 w individual lands can be fitted along the length of the motor (the 0.3 w allows for the phase shift between lands), for a total land edge length of $$l \, L/2.3 \, w. \tag{8}$$

Since only a third of the available lands are charged at any one time, the total active land length generating force is given by $$1 L/6.9 w. \tag{9}$$

Thus, the force generated by such a linear electrostatic motor is $$F = \frac{f_w lL}{6.9 w} = \frac{1}{2} \frac{\epsilon_r \epsilon_0 lLV^2}{6.9 wd}. \tag{10}$$

For a linear electrostatic motor formed on silicon, assuming w=6 microns, l=5 mm, d=1 micron, L=5 cm and V=100 volts, 1.87 newtons (0.42 lbs) of force are generated by a structure which is approximately 0.375 grams in mass.

Figure 8:
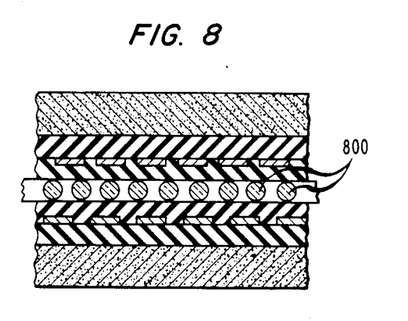
FIG. 8 shows an embodiment in which the stator and rotor are in contact via a lubricating medium of micro-glass spheres suspended in oil.

Even though relative movement of the stator and the rotor can be achieved using the natural lubricating qualities of the insulating layers 312 in FIG. 3, it is found that relative movement is enhanced by placing a film of lubricant between the stator and rotor. In the preferred embodiment, a lubricating medium is used consisting of micro-glass spheres suspended in light oil. This embodiment is illustrated in FIG. 8. The micro-glass spheres have a diameter in the order of 2 microns and are available from Duke Scientific Corporation in Palo Alto, Calif.

Figure 9:
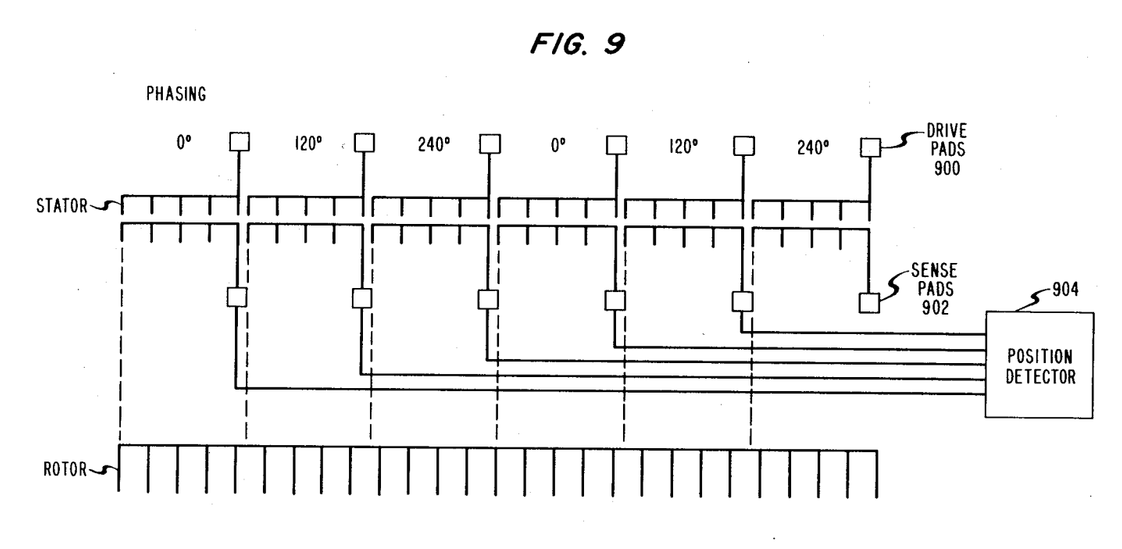
FIG. 9 shows a three-phase linear motor, including both motive lands on the stator and rotor and position-sensing lands on the stator, and a phased relationship between the stator and rotor which allows for extended linear movement.

FIG. 9 presents additional details of the lands on a stator and rotor of a three-phase linear motor. The lands of the rotor are represented at the bottom of the Figure. Capacitive coupling from the stator lands is used to energize the rotor lands. Therefore, all the rotor lands are electrically connected to each other. No external electrical connections to the rotor are required using this arrangement.

Figure 10:
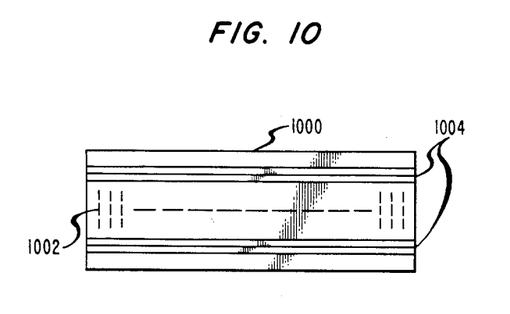
FIGS. 10 through 13 show two arrangements for aligning the stator and rotor of a linear motor.

Alignment of the stator and rotor is a primary problem. FIGS. 10 through 13 show two illustrative methods used to solve the alignment problem in linear motors in accordance with an aspect of the invention. In FIG. 10, a bearing surface 1000 of one of the members, say the stator, is shown. The dashed vertical lines 1002 represent the lands under the bearing surface. Two V-shaped grooves 1004 are cut into the bearing surface. As shown in the edge view of both the stator 1000 and rotor 1100 in FIG. 11, two V-shaped rib aligning members 1102 are arranged to mate with the grooves 1004. The grooves 1004 are formed in the insulating substrate layer by a conventional process of orientation dependent chemical etching. The mating members 1102 can be formed by a process of anisotropic etching.

Figure 11:
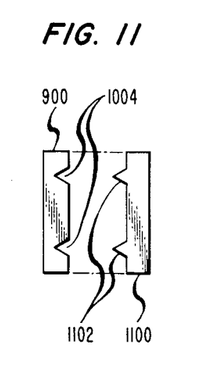
Figure 12:
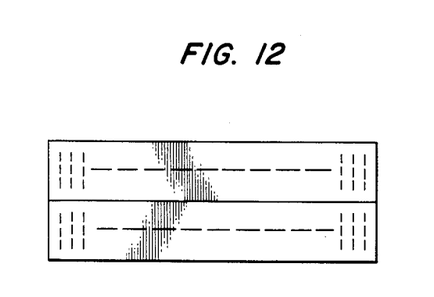
Figure 13:
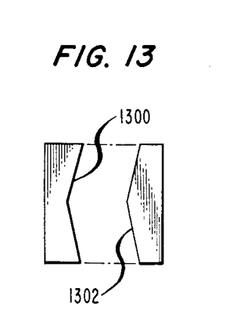

FIGS. 12 and 13 show views similar to those of FIGS. 10 and 11, except that one V groove 1300 and corresponding rib 1302 is used which spans the width of the stator and rotor. In this embodiment, the lands are placed on the V-groove faces, as shown in FIG. 12. There is, of course, a housing which contains and supports the motor. The housing is not shown for simplicity. In conjunction with the housing, the rib and groove technique provides an accurate and convenient alignment means.

Figure 14:
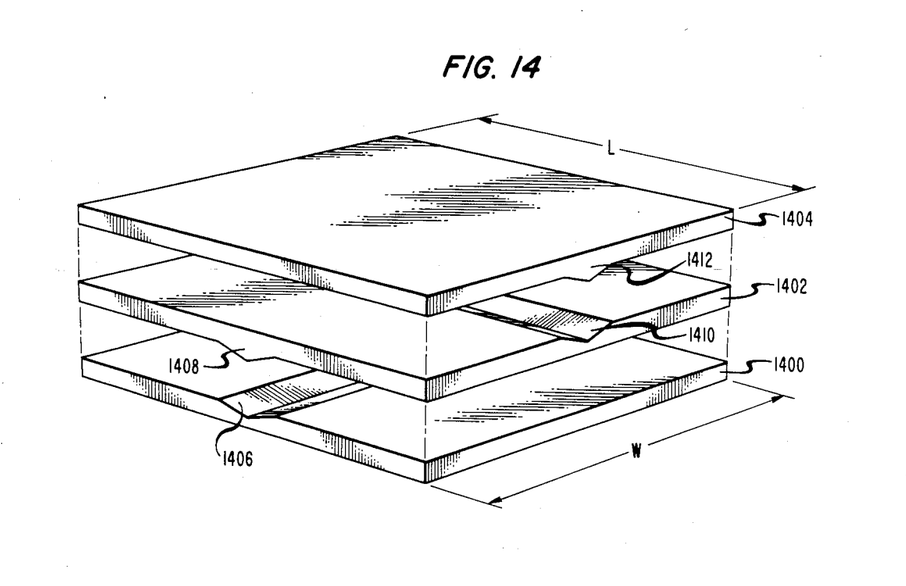
FIG. 14 shows a linear motor having two rotors capable of relative movement in perpendicular directions.

FIG. 14 shows an embodiment of the linear motor that produces rotor movement with two degrees of freedom, as in an x-y plane. Member 1400 may be considered the stator. Members 1402 and 1404 are then first and second rotors, respectively. A groove 1406 in stator 1400 mates with aligning rib 1408 in rotor 1402. Similarly, groove 1410, running perpendicular to the direction of rib 1408, mates with aligning rib 1412 in rotor 1404.

A theoretical model for a rotary electrostatic motor is now developed. The parameters of interest are force, torque, power, alignment tolerances and the capacitance.

Figure 15:
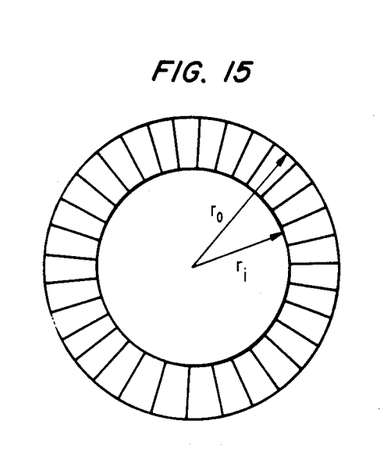
FIGS. 15 through 21 are simplified views of a rotary electrostatic motor and are used to derive equations relating to force, output power and alignment tolerances.

FIG. 15 shows an illustrative rotor (or stator) of a rotary electrostatic motor. The annular ring between $r_i$ and $r_o$ comprises radial lands that produce torque. The torque is given by the relationship $$\tau = r \times F. \tag{11}$$

Because r and F are always perpendicular in this instance, this becomes $\tau = rF$. The incremental torque produced by the incremental ring, r dr is $$d\tau = r \, dF = r\left[\frac{F_w}{l}\right]dl = r\left[\frac{1}{2}\epsilon_r\epsilon_0\frac{V^2}{d}\right]dl. \tag{12}$$

The total length of the lands, dl, in this incremental ring is $$dl = \frac{dA}{n\,p} = \frac{2\pi r\,dr}{n\,p}, \tag{13}$$

where dA is the area within the ring, p is the pitch of the lands, n is the number of motor phases (In a three-phase motor, only one third of the lands are actively producing torque), and dr is the width of the incremental ring. The incremental torque becomes $$d\tau = \frac{\pi\epsilon_r\epsilon_0 V^2}{d\,n\,p} r^2\,dr \tag{14}$$

Integrating to obtain the torque, $$\tau = \int_{r_i}^{r_o} d\tau = \int_{r_i}^{r_o} \frac{\pi\epsilon_r\epsilon_0 V^2}{d\,n\,p} r^2\,dr = \tag{15}$$

$$\frac{\pi\epsilon_r\epsilon_0 V^2}{3d\,n\,p}[r_o^3 - r_i^3].$$

The torque the motor produces is given by Equation 15. The $r_o$ is the outer radius of the motor lands, $r_i$ is the inner radius, p is the pitch of the land faces, and n is the number of phases of the motor. Because the torque depends upon $r^3$, the outer part of the motor produces the majority of the torque. For example, when $r_i/r_o=0.7$, two thirds of the maximum torque is produced. Later, it is shown that increasing $r_i/r_o$ decreases the sensitivity of the motor to misalignments.

The power, P, generated by the above motor is calculated from the above torque, $$P = \tau\omega = \tau 2\pi f, \tag{16}$$

where $\omega$ is the angular frequency, and f is the frequency at which the motor is rotating.

Figure 16:
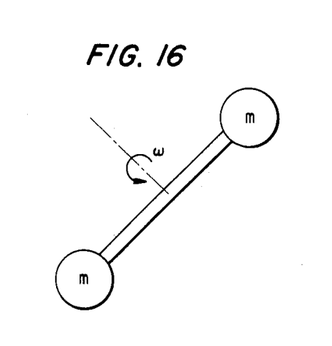

The frequency of rotation increases as the motor becomes smaller. To determine the relationship between frequency of rotation and size, consider FIG. 16. Two rotating masses are connected by a rod. At destruction, the centripetal force needed to keep the masses rotating is equal to the yield strength of the rods, $$F = m\omega^2 r = KA \quad (17)$$

where K is the yield strength. Scaling this equation gives $$\omega^2 = KA/mr.$$

Scaling this by a factor of s yields $$\frac{[s^2]}{[s^3][s^1]} = [s^{-2}] \quad (18)$$

or $$\omega = [s^{-1}]. \quad (19)$$

Therefore, the frequency of rotation scales as $s^{-1}$ for this example. In this particular scaling example, the linear velocity along the edge of the rotor remains constant as the motor is reduced in size. This increase in angular velocity for smaller systems substantially increases the power obtainable from a small motor.

The power a motor can generate is given by Equation 16, where $\tau$ is the torque, and f is the frequency of rotation. As motors become smaller, the inherent increase in f helps to offset the decrease in torque.

Figure 17:
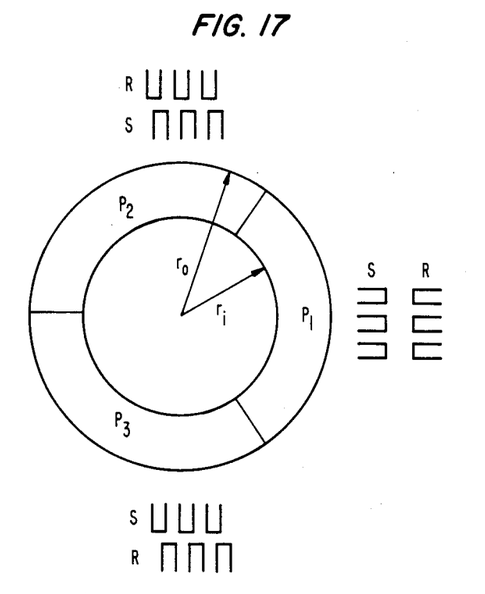

If the centers of the stator and rotor exactly coincide, their lands will be correctly aligned. However, misalignments of rotor and stator centers cause misalignment of the lands on the stator and rotor. FIG. 17 shows a three-phase motor with the stator broken into three sectors, $P_1$, $P_2$ and $P_3$. When the stator and rotor centers are correctly aligned, and the lands of sector $P_1$ are aligned with the rotor, then the lands of sectors $P_2$ and $P_3$ are out of phase by 120°. It is assumed that all the lands within a sector must be aligned with 1/12 of the pitch p (the distance between adjacent lands). All the lands within a sector will be pulling in the correct direction, even with an alignment error of 1/6 of the pitch. There are three sources of alignment error. Two of these sources of misalignments are due to displacements in a $\delta x$ direction, and the third is due to misalignments in a $\delta y$ direction. The resultant allowable errors are presented below as $\delta x_1$, $\delta x_2$ and $\delta y$.

The relationship between $\delta x_1$ and the misalignment e of the lands is given by, $$\delta x_1 = e \frac{r_o + r_i}{r_o - r_i} \text{ where } e = \frac{1}{12} p. \quad (20)$$

where $r_o$ and $r_i$ are the outer and inner radii of the annular ring containing the lands as shown in FIG. 15.

Figure 18:
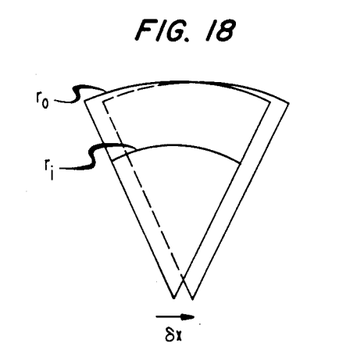

The relationship between $\delta x_2$ and e is given by, $$\delta x_2 = e \frac{1}{(1 - \cos\frac{1}{2}\theta)} \; e = \frac{p}{12} \quad (21)$$

where $\theta$ is the angle of the sector shown in FIG. 18.

Figure 19:
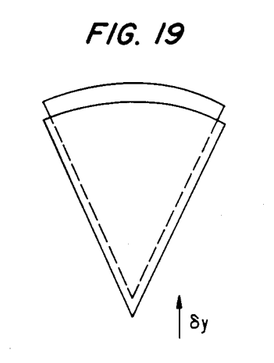

The displacement $\delta y$ results when the entire sector moves up as shown in FIG. 19, and is given by, $$\delta y = \frac{e}{\sin(\frac{1}{2}\theta)} \; e = \frac{1}{12} p. \quad (22)$$

The capacitance between the parallel faces of the lands is given by Equation 1, $$C = \epsilon_r \epsilon_0 \frac{A}{d}, \quad (23)$$

where A is the area (wl) and d is the separation. If n is the number of phases in which the motor has been divided, $r_o$ and $r_i$ are the outer and inner radii of the annular ring containing lands, and half of the annular ring is covered with lands, then the area is $$A = \pi(r_o^2 - r_i^2)\frac{1}{2}\frac{1}{n}. \quad (24)$$

and $$C = \epsilon_r \epsilon_0 \frac{\pi(r_o^2 - r_i^2)}{2 n d}. \quad (25)$$

where $r_o$ and $r_i$ are the inner and outer radii of the annular ring of lands and n is the number of phases of the motor.

The coefficient of friction limits the width of the lands. As the land becomes wider, the force pulling the two lands together increases. However, the force trying to slide one land across the other is constant and depends upon the edge length of the land. When the force between two lands times the coefficient of static friction becomes larger than the force trying to slide the lands, the motor stops moving.

Figure 20:
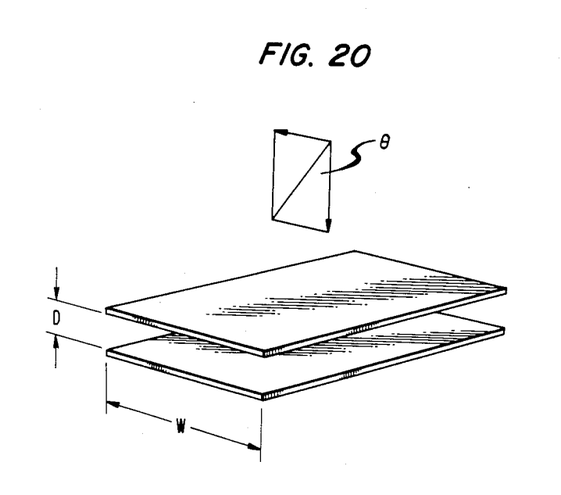

FIG. 20 shows the clamping force $F_+$ and the force $F_s$ needed to break the static friction. The angle between these forces is $\theta$. The value of $F_s$ is given by $$F_s = \mu N \text{ or } \mu = F_s/N; N = F_+ \quad (26)$$

and the angle $\theta$ is given by $$\tan(\theta) = F_s/N = \mu. \quad (27)$$

Figure 21:
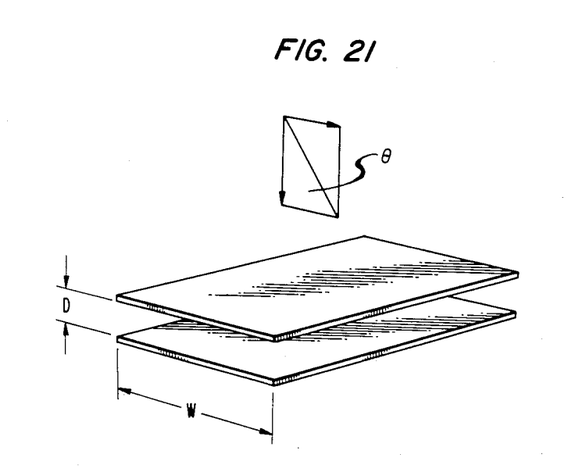

The electrostatic forces acting on the lands is shown in FIG. 21. The $F_+$ is again the clamping force, and $F_{--}$ is the force trying to slide the lands. The value of $\theta$ is $$\tan\theta = -F_{--}/F_+, \quad (28)$$

and using Equations 3 and 5

$$\tan\theta = d/x. \quad (29)$$

For the motor to operate, the force of static friction must be less than the electrostatic force sliding the lands.

$$\mu = F_s/F_+ < F_{--}/F_+ = d/w \quad (30)$$

For typical silicon surfaces $\mu$ is about $\frac{1}{4}$, and $$\mu = \frac{1}{4} < d/w \text{ Let us choose } d > \frac{1}{4} w. \quad (31)$$

If the separation between the lands is greater than one-fourth the land width, then the motor can overcome the coefficient of static friction. If the lands are lubricated, $\mu$ decreases, and the lands can be placed closer to each other.

Table 1 shows the characteristics of one theoretical model of the rotary motor.

TABLE 1

| 5 mm | | |
|---|---|---|
| 1μ | 6μ | 12μ |
| Separation d | Width w | Pitch p |
| 1.5 mm | 2.5 mm | 12 |
| Radius $r_i$ | Radius $r_o$ | Phases n |
| 100 | 130 V | 7 |
| rps | Voltage | $\epsilon_r$ |
| 230 mw | $3.7 \cdot 10^{-4}$ N m | .18 N |
| Power | Torque | Force= |
| 4μ | 30μ | 3.8μ |
| $dx_1$ | $dx_2$ | dy |
| 32 pf | 3.7 cm g | 1 N |
| Capacitance | Torque | Force+ |

Row 1 contains the separation between lands, the width of the lands, and the pitch (separation between adjacent lands). Row 2 contains the inner and outer radius of the annular ring of lands and the number of independently driven sectors of lands (the number of motor phases). Row 3 gives the revolutions per second, rps, at which the rotor is turning, the voltage applied to the lands, and the relative permittivity. Rows 4 through 6 give the results of calculation. Row 4 gives the power output of the motor (neglecting frictional forces which will, of course, reduce this value), the torque and the total force generated parallel to the direction of motion. Row 5 contains the allowable misalignments in the x and y directions. Row 6 has the capacitance, the torque and the force holding the rotor and stator together.

The behavior of the motor as it is scaled to different sizes is given in Table 2. The one millimeter motor produces about 10 milliwatts, the one centimeter motor produces about a watt, and the ten centimeter motor develops about 100 watts.

TABLE 2

| motors 1 mm to 10 cm in diameter | | | | |
|---|---|---|---|---|
| Diameter | Power | Torque | Force | rps |
| 1 mm | 10 mw | $3 \cdot 10^{-6}$ N m | $7 \cdot 10^{-3}$ N | 500 Hz |
| 5 mm | 230 mw | $3.7 \cdot 10^{-4}$ N m | 0.18 N | 100 Hz |
| 1 cm | 920 mw | $3 \cdot 10^{-3}$ N m | 0.72 N | 50 Hz |
| 10 cm | 92 W | 3 N m | 73 N | 5 Hz |

Figure 22:
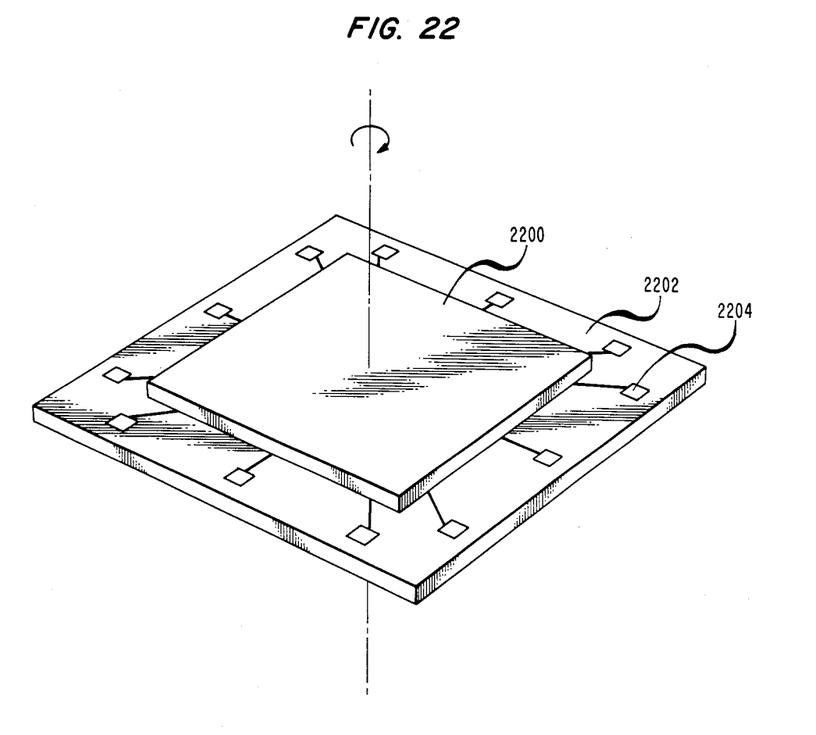
FIG. 22 shows a rotary electrostatic motor embodied in semiconductor substrates.

FIG. 22 shows one miniaturized rotary motor fabricated according to the principles of the invention. A rotor 2200 is located on top. A stator 2202 is larger than the rotor to allow space for connecting pads 2204 and for movement of the rotor. The rotor and the stator are square-shaped because it is easier to cut squares from silicon wafers than circles.

Figure 23:
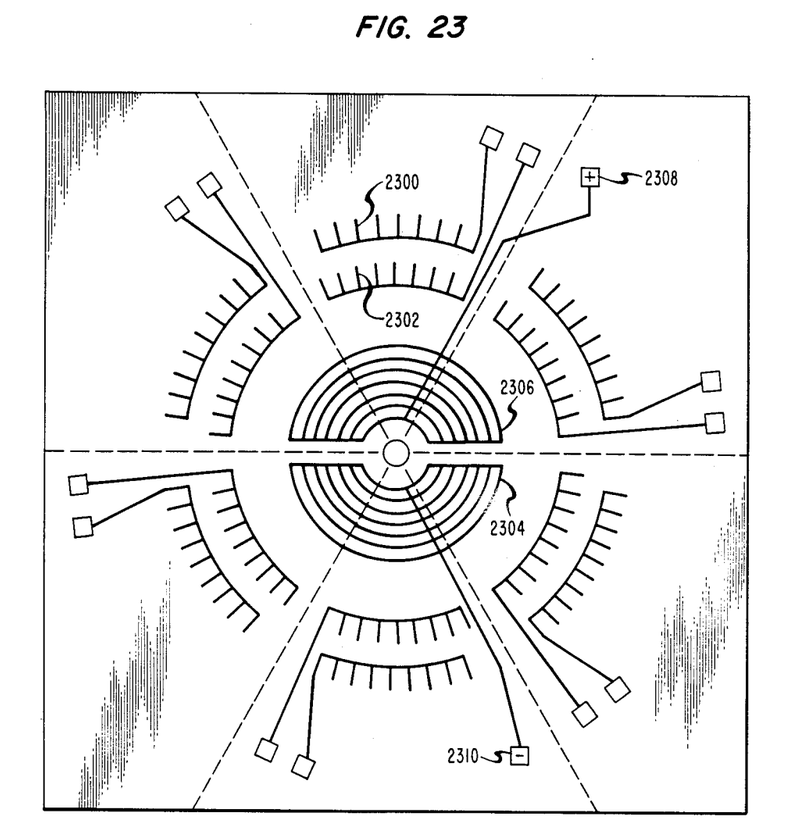
FIG. 23 shows an arrangement of motive and position-sensing lands on the stator of a three-phase rotary motor and concentric lands used to maintain alignment of stator and rotor.
Figure 24:
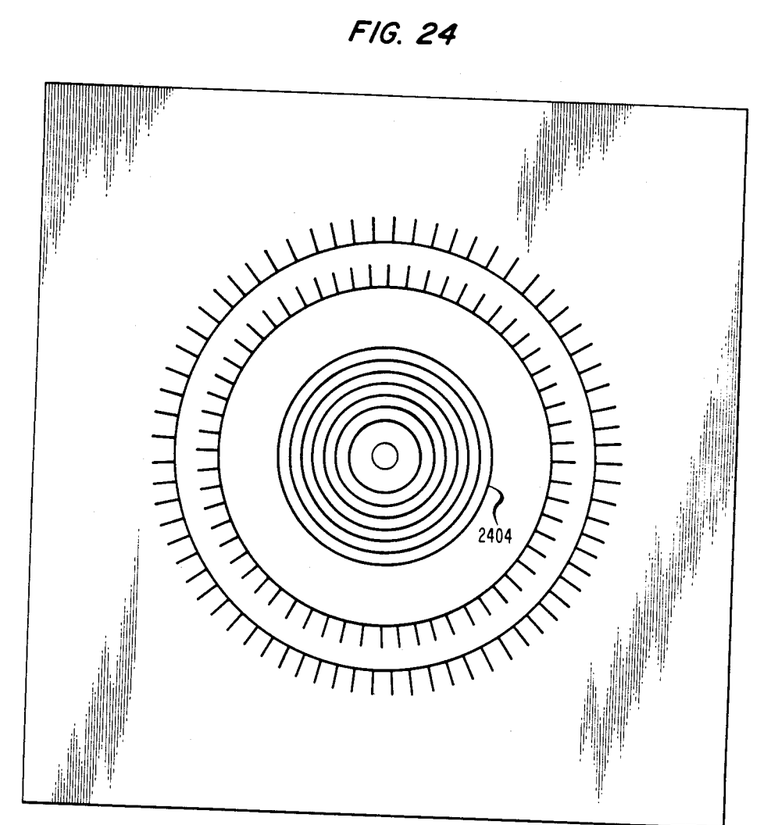
FIG. 24 shows the motive, position-sensing and aligning lands on the rotor corresponding to the stator of FIG. 23.

The arrangement of lands on the stator is illustrated in FIG. 23. The arrangement is the same as that of the linear motor described earlier with the linearly arranged lands bent into a circle. Therefore, this illustrative rotary motor is driven in three phases as the illustrative linear motor. Also as shown, the stator lands include motive lands 2300 and position-sensing lands 2302. Capacitive coupling is used between the stator lands and the rotor lands. Therefore, all rotor lands are electrically connected together, as shown in FIG. 24. This arrangement overcomes the need to provide external electrical connections to the rotor.

Figure 25:
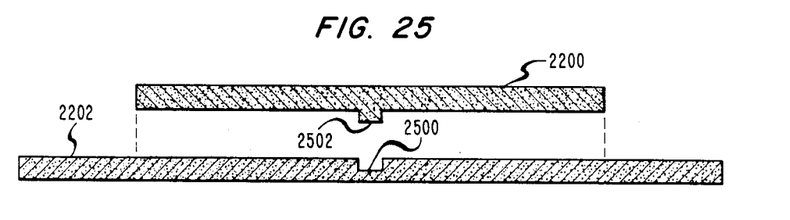
FIG. 25 shows an alternative arrangement for maintaining alignment of the rotary stator and rotor.

One technique of aligning the rotor and stator is illustrated in FIG. 25. A dimple 2500 is etched in the center of the stator (or rotor) by reactive ion etching or other means. A mating protrusion 2502 is formed in the rotor (or stator) by similar means.

Another aligning technique using electrical rather than mechanical means is shown in FIGS. 23 and 24. In this technique, a plurality of concentric alignment lands are deposited on the stator and rotor. The stator alignment lands mate with respective alignment lands on the rotor. The alignment lands on the stator are divided into two electrical groups 2304 and 2306. Opposite potentials are applied to the two alignment groups via bonding pads 2308 and 2310. The alignment lands 2404 on the rotor are electrically common so as not to require external connections. The capacitive coupling between the alignment lands on the rotor and the oppositely charged stator land groups 2304 and 2306 result in an electrostatic attraction between the mating alignment lands that maintains alignment as the rotor spins.

It is understood that the above-described arrangements are illustrative of the application of the principles of the invention, and that other arrangements may be devised by those skilled in the art without departing from the spirit and scope of the invention.

What is claimed is:

1. A miniature electrostatic motor having a stator and a rotor, the stator and rotor each comprising:
   a substrate;
   a plurality of electrically conductive motive lands deposited on a surface of each of the rotor or stator substrates, and
   means for applying voltages selectively to the lands of the stator to effect movement of the rotor, said motor being characterized by
   a layer of insulating material deposited on said one surface of the rotor and stator and the lands thereon to form a bearing surface, said bearing surfaces of the stator and the rotor being in sliding or rolling contact; and
   means for aligning and maintaining alignment of the stator and the rotor with respect to each other.

2. The motor of claim 1 wherein the substrate comprises a semiconductor material.

3. The motor of claim 1 further comprising:
   a lubricating medium between bearing surfaces of the stator and the rotor.

4. The motor of claim 3 wherein the lubricating medium comprises:
   a mixture of micro-spheres suspended in oil.

5. The motor of claim 4 wherein the micro-spheres are made of glass.

6. The motor of claim 1 wherein the stator and rotor lands are arranged linearly on the respective substrates to form a linear motor.

7. The motor of claim 1 wherein the stator and rotor lands are arranged in a circular pattern on the respective substrates to form a rotary motor.

8. The motor of claim 6 wherein the aligning means further comprises:
   one or more grooves located in the bearing surface of the stator or rotor and positioned in the direction of linear movement of the motor; and
   one or more ribs located on the bearing surface of the other one of the stator or rotor and arranged for mating with the one or more grooves.

9. The motor of claim 8 wherein two grooves and ribs are used for alignment and the lands are located between the grooves and the ribs on the rotor and stator, respectively.

10. The motor of claim 8 wherein one groove and rib are used for alignment, said groove and rib each having two surfaces forming the groove and rib and with the two surfaces of each of the groove and rib extending the span of the motor in a direction perpendicular to the direction of movement of the motor and wherein lands are deposited onto each surface.

11. The motor of claim 8 wherein each groove and rib is v-shaped.

12. The motor of claim 8 wherein one of the stator or rotor further comprises a second bearing surface on a second side of the substrate and the motor further comprises a second rotor with a bearing surface in contact with the second bearing surface of the stator or the first rotor, said second rotor having one or more grooves or ribs running in a direction perpendicular to the direction of movement of the first rotor for mating with one or more ribs or grooves in the first rotor or stator.

13. The motor of claim 7 wherein one of the stator or rotor has a circular opening formed in its bearing surface at the center of rotation and the aligning means further comprises a protrusion in the bearing surface of the other of the stator or rotor and located at the center of rotation for mating with the circular opening.

14. The motor of claim 7 wherein the aligning means further comprises:

a plurality of electrically common conductive lands concentric about the center of rotation of the rotor and a plurality of mating conductive concentric lands in the stator concentric about the center of rotation, the stator alignment lands being partitioned into two hemispheres with the lands in each hemisphere being electrically common; and means for applying opposite electrical potentials to the hemispheres.

15. The motor of claim 1 further comprising:

a plurality of electrically conductive position-sensing lands located in the bearing surface of the stator and rotor, the position sensing lands being arranged in correspondence with the motive lands of the stator and rotor; and output means electrically connected to the position-sensing lands on the stator for providing indications of the capacitance between the stator position-sensing lands and the rotor position sensing lands.

16. The motor of claim 1 further characterized by the stator motive lands being electrically partitioned into groups to form a motor with one or more phases and the rotor motive lands forming one electrical group, the lands in each stator group being phased with respect to the rotor lands such that when the lands of one stator group are in alignment with a subset of rotor lands, the lands of the remaining stator groups are offset in alignment by different prescribed amounts with respect to the corresponding subsets of rotor lands.

17. The motor of claim 2 wherein the semiconductor material is silicon.

* * * * *